(12) United States Patent
Zhang et al.

(10) Patent No.: US 10,689,108 B2
(45) Date of Patent: Jun. 23, 2020

(54) UNMANNED AERIAL VEHICLE WITH OMNIDIRECTIONAL THRUST VECTORING

(71) Applicant: Advance Technology Holdings, L.L.C., University Park, MD (US)

(72) Inventors: Lihua Zhang, University Park, MD (US); Xing Wang, University Park, MD (US); Zheng Zhang, College Park, MD (US)

(73) Assignee: Advance Technology Holdings, L.L.C., University Park, MD (US)

( * ) Notice: Subject to any disclaimer, the term of this patent is extended or adjusted under 35 U.S.C. 154(b) by 363 days.

(21) Appl. No.: 15/604,907

(22) Filed: May 25, 2017

(65) Prior Publication Data
US 2018/0148169 A1 May 31, 2018

Related U.S. Application Data

(60) Provisional application No. 62/426,948, filed on Nov. 28, 2016.

(51) Int. Cl.
*B64C 39/02* (2006.01)
*B64C 29/00* (2006.01)
(Continued)

(52) U.S. Cl.
CPC ............ *B64C 39/024* (2013.01); *B64C 1/061* (2013.01); *B64C 19/00* (2013.01);
(Continued)

(58) Field of Classification Search
CPC ..... B64C 29/0033; B64C 27/52; B64C 37/02; B64C 27/20; G05D 1/104
See application file for complete search history.

(56) References Cited

U.S. PATENT DOCUMENTS 6,032,904 A * 3/2000 Hosick ..................... B64G 1/26
244/169
8,052,081 B2 11/2011 Olm et al.
(Continued)

FOREIGN PATENT DOCUMENTS

RU 2547950 C1 4/2015
RU 157967 U1 12/2015

OTHER PUBLICATIONS

International Search Report and Written Opinion issued for PCT/US2017/063291, dated Mar. 6, 2018.

*Primary Examiner* — Christopher D Hutchens
(74) *Attorney, Agent, or Firm* — Westman, Champlin & Koehler, P.A.; Z. Peter Sawicki; Amanda M. Prose

(57) ABSTRACT

An unmanned aerial vehicle (UAV) with omnidirectional thrust vectoring includes a central unit, a connective structure, and a plurality of propulsion units with omnidirectional thrust vectoring allowing a full six degrees of freedom. A vectored propulsion unit comprises thruster vectored by an omnidirectional mechanism and may include an autonomous sub-vehicle housed within a rotational frame, or an actuator-thruster assembly with directional control. A UAV with omnidirectional thrust vectoring includes a control system with a ground station unit, a central flight control unit, and a propulsion control unit. A plurality of vectored propulsion units working in coordination allows an unmanned aerial vehicle to maneuver with any stance or body orientation.

8 Claims, 9 Drawing Sheets

(51) Int. Cl.
    *B64C 1/06*          (2006.01)
    *B64C 19/00*        (2006.01)
    *B64C 37/02*        (2006.01)
    *B64C 27/08*        (2006.01)

(52) U.S. Cl.
    CPC .......... *B64C 29/0033* (2013.01); *B64C 37/02* (2013.01); *B64C 27/08* (2013.01); *B64C 2201/141* (2013.01); *B64C 2201/146* (2013.01); *B64C 2201/162* (2013.01)

(56) References Cited

U.S. PATENT DOCUMENTS

| | | |
|---|---|---|
| 8,128,033 B2 | 3/2012 | Raposo |
| 8,733,690 B2 | 5/2014 | Bevirt et al. |
| 10,351,234 B1* | 7/2019 | Dennis .................. B64C 27/08 |
| 2009/0084890 A1* | 4/2009 | Reinhardt ........... B64C 29/0033 244/12.4 |
| 2013/0105635 A1* | 5/2013 | Alzu'bi ................ B64C 39/024 244/23 A |
| 2016/0114887 A1* | 4/2016 | Zhou ........................ B60F 5/02 348/148 |
| 2016/0159472 A1 | 6/2016 | Chan et al. |
| 2016/0176545 A1* | 6/2016 | Munir ...................... B64G 1/26 244/158.6 |
| 2016/0325829 A1 | 11/2016 | Ahn et al. |
| 2016/0347447 A1* | 12/2016 | Judas .................. B64C 29/0033 |
| 2017/0313410 A1* | 11/2017 | Ismagilov ............... B64C 27/08 |
| 2018/0305008 A1* | 10/2018 | Apkarian .................. B64F 5/10 |
| 2018/0354607 A1* | 12/2018 | Marot ..................... B64C 11/06 |
| 2019/0135420 A1* | 5/2019 | Regev ..................... B64C 27/22 |

\* cited by examiner

UNMANNED AERIAL VEHICLE WITH OMNIDIRECTIONAL THRUST VECTORING

BACKGROUND

The present disclosure is related to unmanned aerial vehicles. More particularly, the present disclosure is related to propulsion and control systems for unmanned aerial vehicles.

Propulsion units on traditional Unmanned Aerial Vehicles (UAVs) have limited maneuverability. In a typical four motor-rotor assembly, such as a quadcopter, the only controllable output is the thrust level, with all thrust directed in a downward direction, and the control of roll, pitch, yaw, and altitude achieved by adjusting the thrust level on specific propulsion units. The lack of thrust direction controllability confines the UAV to four degrees of freedom, as lateral translation is coupled with roll, and forward translation is coupled with pitch, and therefore the maneuverability and orientation of the central unit ("CU") of a UAV is restricted. This restriction means the body of a traditional UAV is unable to tilt without creating an accompanying drift motion of the entire UAV. The inability to change thrust direction also makes flying upside down difficult and unstable.

Limited thrust direction is also a detriment in circumstances requiring a high degree of maneuverability or a stable platform for payloads. Limited thrust direction also restricts a payload's possible field of view. For example, photography payloads mounted under the fuselage of a traditional UAV have a limited view coverage because they are unable to look above their own horizon. The view coverage cannot be entirely spherical without a separate camera system, since a camera mounted under a fuselage is unable to see through the vehicle.

The speed and orientation of a UAV are also affected when altering the orientation of a traditional UAV's body, as they are coupled with sideways acceleration. This can limit a UAV's accessibility in enclosed environments, and its ability to interact with objects. Engine failure on a traditional UAV can disrupt the flight system and cause loss of control due to insufficient thrust or unbalanced torque. The likelihood of engine failure is even greater in environments with dusty air, high temperatures, flying birds, or environments with complex passages.

SUMMARY

This Summary and Abstract are provided herein to introduce a selection of concepts in simplified form that are further described below in the Detailed Description. The Summary and Abstract are not intended to identify key features or essential features of the claimed subject matter, nor are they intended to be used as an aid in determining the scope of the claimed subject matter. The claimed subject matter is not limited to the implementations that solve any or all the disadvantages noted in the background.

A UAV with omnidirectional thrust vectoring includes a central unit, a connective structure, and a plurality of vectored propulsion units. The vectored propulsion units may be comprised of thrust sources housed within an omnidirectional frame enabling thrust to be vectored in multiple degrees of freedom. In one embodiment the UAV propulsion unit may include autonomous sub-vehicles attached to the freely rotating omnidirectional frame. In a further embodiment, the autonomous sub-vehicles may be comprised of sub-UAVs.

In an alternative embodiment, a vectored propulsion unit may be comprised of an actuator-thruster assembly. The propulsion unit may include a uni-directional thruster housed within an omnidirectional frame fully rotatable in multiple degrees of freedom through actuator control.

In one embodiment, a UAV may connect the central unit with the propulsion units with a connective structure comprising arms and rotatable linkages. A rotatable linkage enables the arms to translate the propulsion units through multiple degrees of freedom relative to the central unit to achieve various UAV flight configurations.

A UAV with omnidirectional thrust vectoring includes a control system comprised of a ground station unit with user inputs, terminal outputs and communications devices, a central flight control unit, and a propulsion control unit. The central flight control unit may include a swarm controller to track and coordinate each propulsion unit relative to a central unit.

DETAILED DESCRIPTION

The following detailed description is not to be taken in a limiting sense, but is made merely for the purpose of illustrating the general principles of the apparatus described herein.

This disclosure describes an unmanned aerial vehicle ("UAV") utilizing omnidirectional thrust vectoring to enable the central unit to orient a payload in any direction.

Traditional UAVs have limited maneuverability due to their inability to control thrust direction with respect to the fuselage. The lack of thrust direction controllability restricts the maneuverability and orientation of a UAV and causes drift motion when tilting and re-orienting the central unit. This restriction in thrust control limits traditional UAVs to four degrees of freedom instead of a full six degrees of freedom, which is comprised of three dimensional translations and uncoupled roll, pitch, and yaw movement. Roll or pitch motions are also restricted in traditional UAVs because exceeding a certain maximum angle will eventually cause a vehicle to stall. A UAV with vectored thrust may maintain any stance, disregarding the speed, enabling a central unit or its payload to point in any direction during flight. In one embodiment, multiple autonomous sub-vehicles housed within an omnidirectional mechanism form a vectored propulsion unit enabling a full range of roll, pitch, and yaw movement to be achieved by vectored thrust. The overall resultant thrust of each propulsion unit is a net effect of all individual thrust vectors, and coordination of each propulsion unit's thrust allows the UAV to form any stance through swarm coordination.

As used herein, the term "propulsion unit" ("PU") refers to a vectored propulsion unit of the UAV.

As used herein, the term "flight configuration" refers to the various possible positions and orientations of the arms and propulsion units and their thrust vectors configured relative to the central body of the UAV.

As used herein, the term "stance" refers to the various UAV formations possible when PUs have different vectors.

As used herein, the term "swarm" refers to the coordination of all autonomous sub-vehicles or individual motors of the UAV to achieve vectored thrust.

Figure 1:
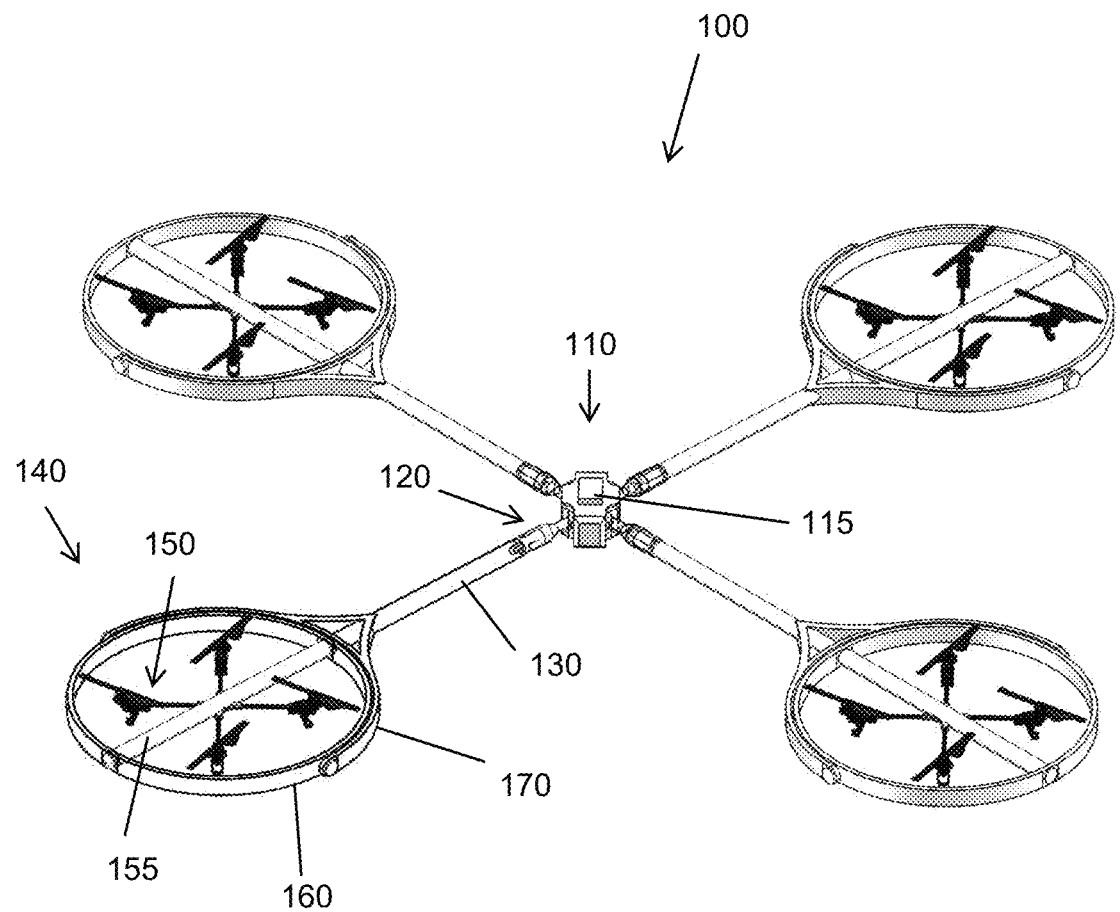
FIG. 1 is a perspective view of an unmanned aerial vehicle using autonomous sub-vehicles as vectored propulsions units.

FIG. 1 illustrates a UAV in a normal flight configuration and level stance utilizing sub-UAVs as propulsion units. In FIG. 1, the UAV 100 is comprised of a body or central unit 110 which contains a power system; sensors, such as a gyroscope, magnetometer, inclinometer, and optical flow sensor; flight electronics, such as a GPS, radio transmitter, and microcontroller; and a central unit flight control system. Attached to the central unit 110 is a mount 115 for a payload which can be attached according to a pilot's needs. The mount 115 enables a pilot to selectively attach a plurality of payloads, such as a camera, directional antenna, laser optics, scientific probe, robotic arm, or a fire-retardant system. However, these payloads are exemplary only and a pilot may attach any payload which could benefit from the ability to orient the central unit omnidirectionally or move the UAV without an accompanying drift motion. The central unit 110 is connected to arm 130 by linkage 120 (shown as 300 in FIG. 3). Arm 130 is further connected to the PU 140.

Although the term "arm" is used in the figures and description herein, an embodiment need not be so limited. One skilled in the art would recognize that an unmanned aerial vehicle with omnidirectional thrust vectoring may house payloads, flight electronics, and propulsion units within a unitary body. As used herein, the referred to central unit 110 is the platform that carries all flight electronics and payloads. An arm 130 is the connective structure acting as the linkage connecting the central unit 110 to the PU 140.

In the embodiment of FIG. 1, vectored propulsion unit 140 consists of an autonomous sub-vehicle 150, which is illustrated in this example as a quadcopter. In this embodiment, the autonomous sub-vehicle 150 is an independent sub-UAV that is attached to a rotatable supporting rod 155. The supporting rod 155 can freely rotate 360° via bearings and is further attached to a rotatable inner ring 160. The inner ring 160 can freely rotate 360° via bearings and is attached to an outer ring 170, wherein the outer ring 170 is attached to the arm 130. The combination of the supporting rod 155, inner ring 160, and outer ring 170 forms an omnidirectional frame connected to the sub-UAV 150, and allows for a full range of roll, pitch, and yaw motions for the vectored thrust of a PU 140. In one embodiment, the UAV sends electrical power to the PU 140 from the central unit 110 through a wire via the arm 130 to power the sub-UAV 150. However, a propulsion unit 140 may be powered by alternative means, such as by an independent battery.

Figure 2:
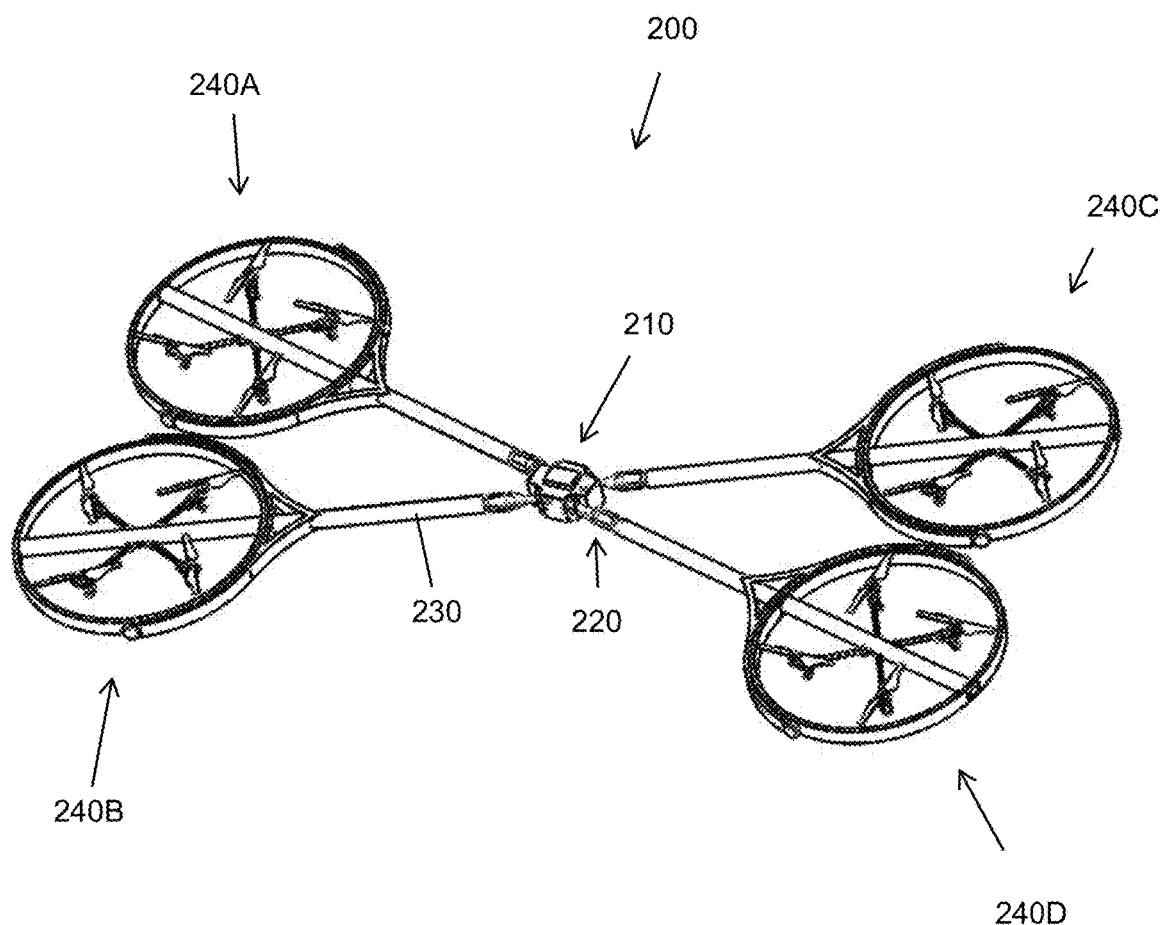
FIG. 2 is a perspective view of an unmanned aerial vehicle transformed to an alternate flight profile.

FIG. 2 illustrates an embodiment of the UAV of FIG. 1 wherein the UAV is transformed into an alternate flight configuration. The UAV 200 consists of the same components of FIG. 1, wherein the central unit 210 is connected to the arm 230 by the linkage 220, and the arm 230 is further connected to the vectored propulsion unit 240. The flight configuration of the UAV 200 has been altered by moving propulsion units 240A and 240B closer together and propulsion units 240C and 240D closer together by the selective adjustment of linkages 220. A plurality of flight configurations may be achieved by altering the horizontal and vertical translation of each linkage 230.

Figure 3:
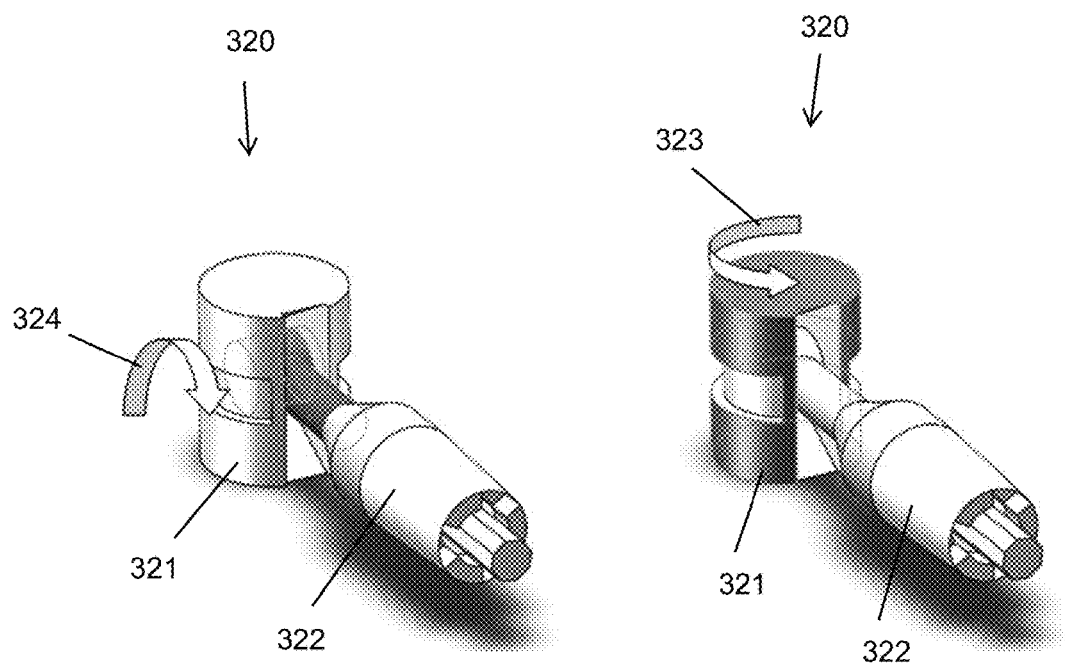
FIG. 3 is a perspective view of the arm linkage of an unmanned aerial vehicle enabling alternate flight profiles.

FIG. 3 illustrates an expanded view of linkage 220. Linkage 320 consists of two rotational joints 321 and 322, which combined add two degrees of freedom to the arm 230 of the UAV 200. The horizontal joint 321 is rotatably connected to the central unit 210 and is capable of horizontal translation along the path of arrow 323. The vertical joint 322 is rotatably connected to the horizontal joint 321 and is capable of vertical translation along the path of arrow 324. The horizontal joint 322 is further connected to the arm 230, enabling the arm 230 and propulsion unit 240 to translate both horizontally and vertically with respect to the central unit. Each rotational joint 321, 322 of a linkage 320 is controlled by an actuator which may be located within the central unit 210 and enables a UAV 200 to transform its flight configuration, allowing the UAV to alter its aerodynamic structure when needed. One skilled in the art would recognize that this embodiment may affect UAV structural versatility, but it does not impact the UAV's ability to omnidirectionally orient the central unit.

Figure 4:
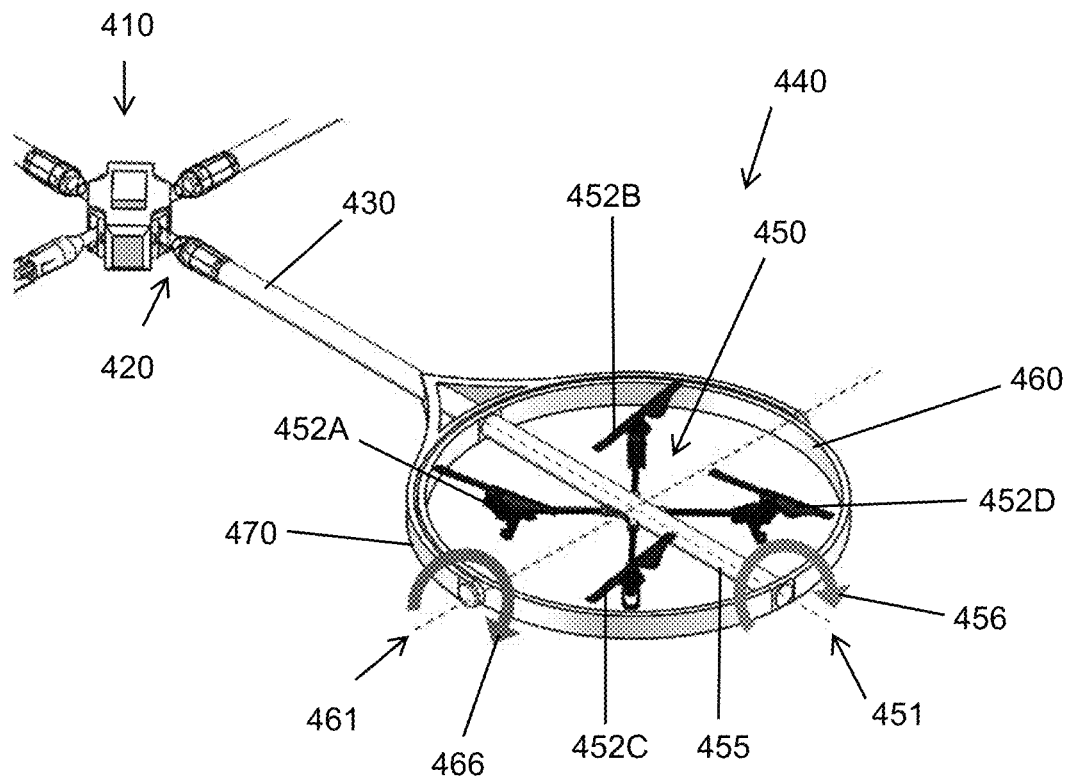
FIG. 4 is a perspective view of an autonomous sub-vehicle as a vectored propulsion unit.

FIG. 4 illustrates the two degrees of freedom achieved by a sub-UAV 450 to form a vectored propulsion unit 440 attached to the central unit 410 via an arm 430 and linkage 420. In this embodiment, the sub-UAV 450 is attached to a support rod 455. The support rod 455 is rotatably attached via bearings to an inner ring 460 and may rotate a full 360° along the supporting rod's 455 longitudinal axis 451. The inner ring 460 is rotatably attached via bearings to an outer ring 470 and may rotate a full 360° along the inner ring's 460 lateral axis 461, which is orthogonal to the supporting rod's 455 longitudinal axis 451. Two degrees of freedom are achieved by the sub-UAV's roll and pitch movement as thrust is coordinated between the individual motors 452 of the sub-UAV 450. For example, when individual motors 452A and 452C provide greater thrust than individual motors 452B and 452D, the sub-UAV 450 will roll along the longitudinal axis 451 in the direction of the longitudinal arrow 456. When individual motors 452A and 452B provide greater thrust than individual motors 452C and 452D, the sub-UAV 450 will pitch along the lateral axis 461 in the direction of the lateral arrow 466. Therefore, a propulsion unit 440 vectors thrust by controlling the thrust of individual motors 452 of sub-UAV 450 within the omnidirectional mechanism formed by the supporting rod 455, the inner ring 460, and the outer ring 470.

As described above, a vectored propulsion unit may be comprised of an independent sub-UAV connected to an omnidirectional mechanism enabling multiple degrees of freedom. In an alternative embodiment, the vectored propulsion unit may utilize an actuator-thruster design comprising a uni-directional thruster housed in an omnidirectional frame with actuators to vector thrust as desired.

Figure 5:
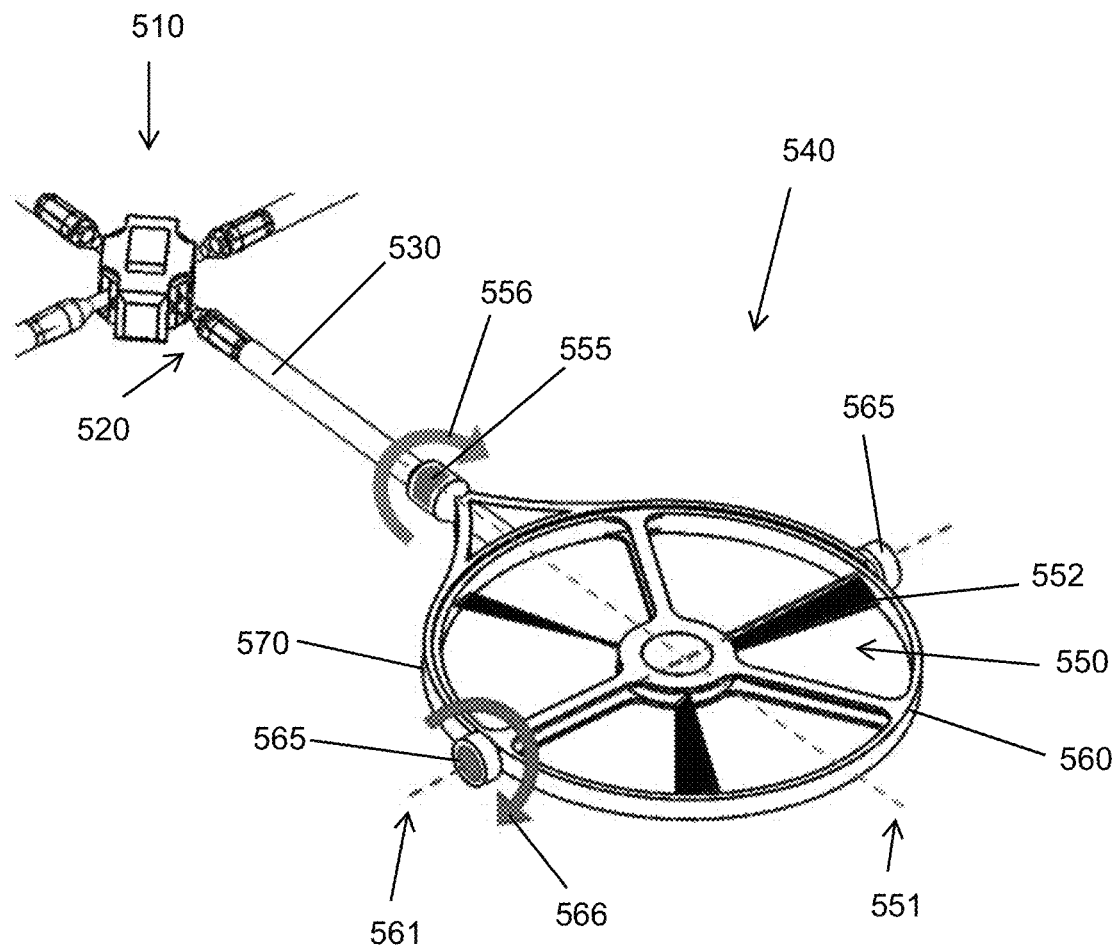
FIG. 5 is a perspective view of an actuator-thruster design as a vectored propulsion unit.

FIG. 5 illustrates an embodiment of an actuator-thruster design for a vectored propulsion unit 540 attached to the central unit 510 via an arm 530 and linkage 520. The thruster 550 provides thrust in a single direction and may be a propeller, ducted fan, or other propulsion device capable of providing sufficient thrust for a UAV. In this example, the thruster 550 embodied in FIG. 5 is a three-bladed propeller 552 housed within an inner ring 560. The inner ring 560 may rotate a full 360° via a lateral actuator 565 along a lateral axis 561. The inner ring 560 is further connected to an outer ring 570. The outer ring 570 is attached to an arm 530 and may rotate a full 360° via a longitudinal actuator 555 about a longitudinal axis 551. Therefore, propulsion unit 540 vectors the thrust of thruster 550 and enables two degrees of freedom by controlling the actuators 555, 565 to rotate the inner ring 560 and outer ring 570.

As described above, the omnidirectional mechanism utilizes a half-ring as an outer ring 170, 570 and a full ring as an inner ring 160, 560. However, the embodiment need not be so limited, and the omnidirectional mechanism may comprise two independent half-rings, two complete rings, or other configurations enabling two or three degrees of rotational freedom for vectored thrust.

One embodiment of a UAV with omnidirectional thrust vectoring is through swarm propulsion. In swarm propulsion, a UAV utilizes multiple autonomous sub-vehicles acting as vectored propulsion units. The engines on a traditional UAV design are unidirectional motors that only produce thrust in a desired magnitude. A UAV with vectored propulsion creates local vectored propulsion by coordinating and combining the independent motors of each sub-UAV to produce the desired net thrust of the UAV. The stance of a UAV may be configured by a swarm formation through the coordination of the vectored thrust of individual PUs, wherein the overall resultant thrust is a net effect of all individual PU thrust vectors.

With swarm propulsion, each sub-UAV acting as a propulsion unit is an independent functional UAV with its own flight control software and propulsion system.

A UAV implements swarm propulsion through software control by coordinating the sub-UAVs acting as propulsion units. This allows the PUs to independently manage the thrust of individual motors of each sub-UAV, to achieve the desired orientation of the UAV's central unit. The UAV may be controlled manually or autonomously. The UAV may also have operations that are completed autonomously but under manual control. Such features may include, but are not limited to, self-leveling, protective autonomous landing, or the ability to assume an emergency stance due to the loss of a propulsion unit's thrust.

Figure 6:
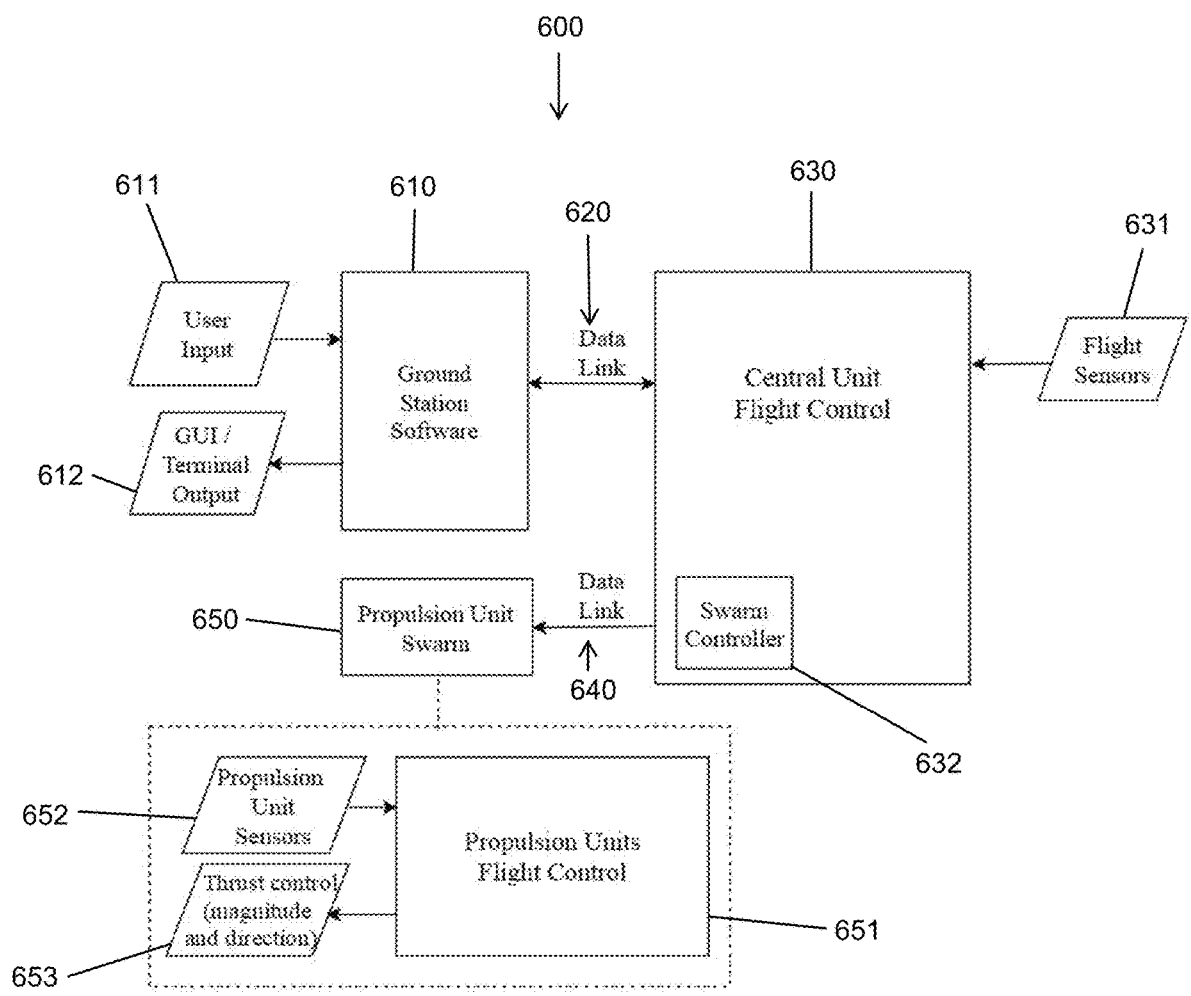
FIG. 6 is a diagram of a system for controlling an unmanned aerial vehicle.

FIG. 6 is a diagram for controlling a UAV with omnidirectional thrust vectoring. A propulsion control system 600 includes ground station software 610, which takes user input 611 and preprocesses the data to remove noise and translate the raw signal into a state control signal. The user input 611 is transmitted by the ground station software 610 through a data link 620 to the Central Unit Flight Control ("CFC") 630. The CFC 630 is installed in the central unit to create vector and thrust intake status signals from the ground station software 610 through the data link 620 and through central unit flight sensors 631 to generate goals for the swarmed propulsion units 650.

The CFC 630 includes a swarm controller ("SC") 632 which controls the thrust magnitude of each PU in a manner similar to a flight control system of a traditional multi-rotor UAV. The SC 632 also controls the vectors of each PU's thrust by commanding the PUs to perform local roll or pitch maneuvers. The SC tracks the location of each sub-UAV acting as a propulsion unit relative to their position to the central unit, allowing the UAV to assume various stances.

The CFC 630 vectors thrust of individual PUs by transmitting instructions through data link 640 to the propulsion unit's flight control ("PFC") 651. The PFC 651 is the local flight control on a PU that stabilizes each PU and controls their maneuvers. The PFC 651 collects information from propulsion unit flight sensors 652 of the PU and received thrust control information regarding magnitude and direction from CU to vector the thrust. The PFC 651 may store flight status and wirelessly stream data to the CFC 630. By individually controlling the magnitude and vector of individual PU's, a plurality of PUs working in coordination allows a UAV to form any stance or central unit orientation.

In an embodiment where the UAV utilizes autonomous sub-vehicles, the CFC 630 vectors individual PUs by manipulating the thrust of individual thrusters on each sub-UAV. The PFC 651 receives information from propulsion unit flight sensors 652 of the PU, and transmits thrust control information 653 to manage the thrust magnitude of the local motors. Thus, by altering the magnitude of thrust of a motor on a sub-UAV, a torque with any direction can be exerted by each PU from its relative position with respect to the central unit.

In an embodiment where the UAV utilizes an actuator-thruster design, the CFC 630 vectors individual PUs by manipulating the actuators of individual PUs. The SC 632 controls the thrust magnitude of the thrusters in a manner similar to a flight control system of a traditional multi-rotor UAV, and controls the vector of the PU 650 by commanding each PU to roll or pitch through actuators, such as actuators 555, 565 featured in FIG. 5. The PFC 651 receives information from propulsion unit flight sensors 652 of the PU, and transmits thrust control information 653. By tracking each propulsion unit 650 relative to their position to the central unit, and coordinating the vector and thrust of each PU, the SC 632 allows the UAV to assume various stances and orientations.

A data link 620 may transmit flight status data from the CFC 630 to the ground station software 610 to be displayed at a terminal output 612. The CFC 630 may also collect status data from the PU swarm 650 via wireless transmission to aid in goal generation for the PUs. The SC 632 may be installed in the CFC 630 to coordinate a centralized omnidirectional thrust vectoring scheme. In one embodiment, the SC 632 decides the behavior of each PU based on a user's choice of performance versus energy cost priority. The SC 632 may also operate within each propulsion unit to create a decentralized swarm system. Data may be transferred between the CFC 630 and the PUs 650 through data links, which may include ZigBee, Wi-Fi, or Bluetooth.

In another embodiment, the motion planner stores preset stance formations. These presets may include a forward-roll maneuver (see FIG. 8) or a vertical stance maneuver (see FIG. 9). Alternatively, the stance presets may also be customized by a user. The motion and corresponding trajectories stored in the central unit may also be used automatically by the motion planner depending on the circumstances. For example, if a PU is damaged or no longer produces effective thrust, a motion planner can quickly recalculate the flight stance with a balanced torque, or use a stored preset to quickly reform the remaining PUs to prevent loss of control.

A user may control the UAV in one embodiment by directing the central unit to change orientation. When the user directs the UAV to assume the new orientation, the CFC 630 coordinates the movement through the SC 632 to perform the action that minimizes the traverse distance and possible impact to system-wide stabilization. The CFC 630 will assign goals to the PUs 650, and the PUs 650 will then try to reach them autonomously. The SC 632 is able to calculate in-air stance based on the UAV structure geometry, the dimension of the arm structure of the UAV, and the relative location of the PUs 650 with respect to the central unit. The CFC 630 measures and calculates current acceleration and angles based on CU's sensor, and PU measures PU's based on the PU sensors 652, which may include a gyroscope, an accelerometer and or an inclinometer.

For example, a user may direct the UAV to orient a payload upwards, such as a camera, when the payload had previously been directed downwards. The SC 632 will detect the locations of the PUs 650 with respect to the central unit through sensors 631, 652; and the SC 632 will coordinate the PUs to perform local roll or pitch maneuvers. The individual maneuvers of the PUs will incline the central unit's orientation by lifting certain propulsion units up and lowering others. The action is completed once the new stance is formed and the central unit is facing in the desired upward direction.

Figure 7:
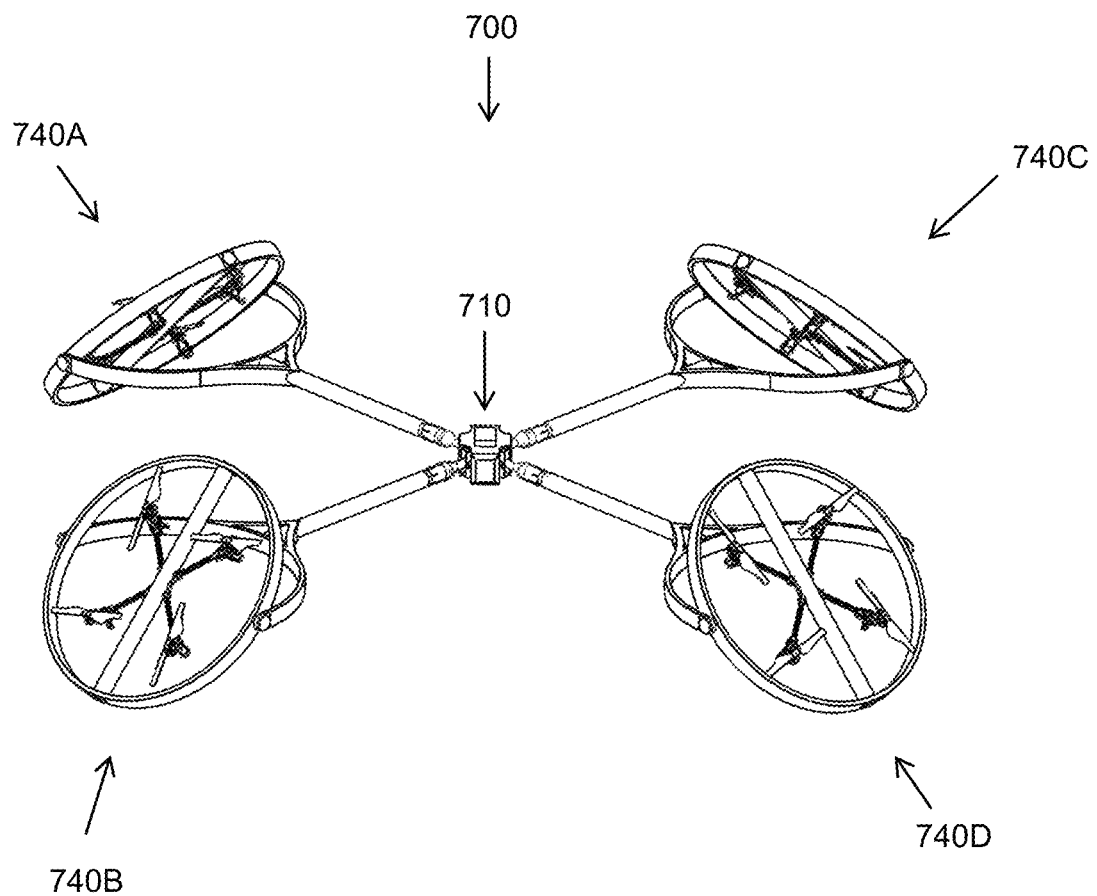
FIG. 7 illustrates an example of an unmanned aerial vehicle in an alternate stance.

FIG. 7 illustrates an example of an unmanned aerial vehicle in an alternate stance. In this stance, the UAV 700 is in a horizontal position with an upward facing central unit 710 capable of hovering, but with the PUs 740 providing thrust in four different local vectors, or Euler angles, with respect to the central unit. Here, the thrust produced by each PU 740 is in a different angle, but the combined components of downward thrust is sufficient for hovering. This stance is produced by rolling each PU 740A, B, C, D outward by 45° from the PU's local frame of reference—its own frame of reference. From the central unit's 710 frame of reference, each PU 740 is not translated but rotated.

Figure 8:
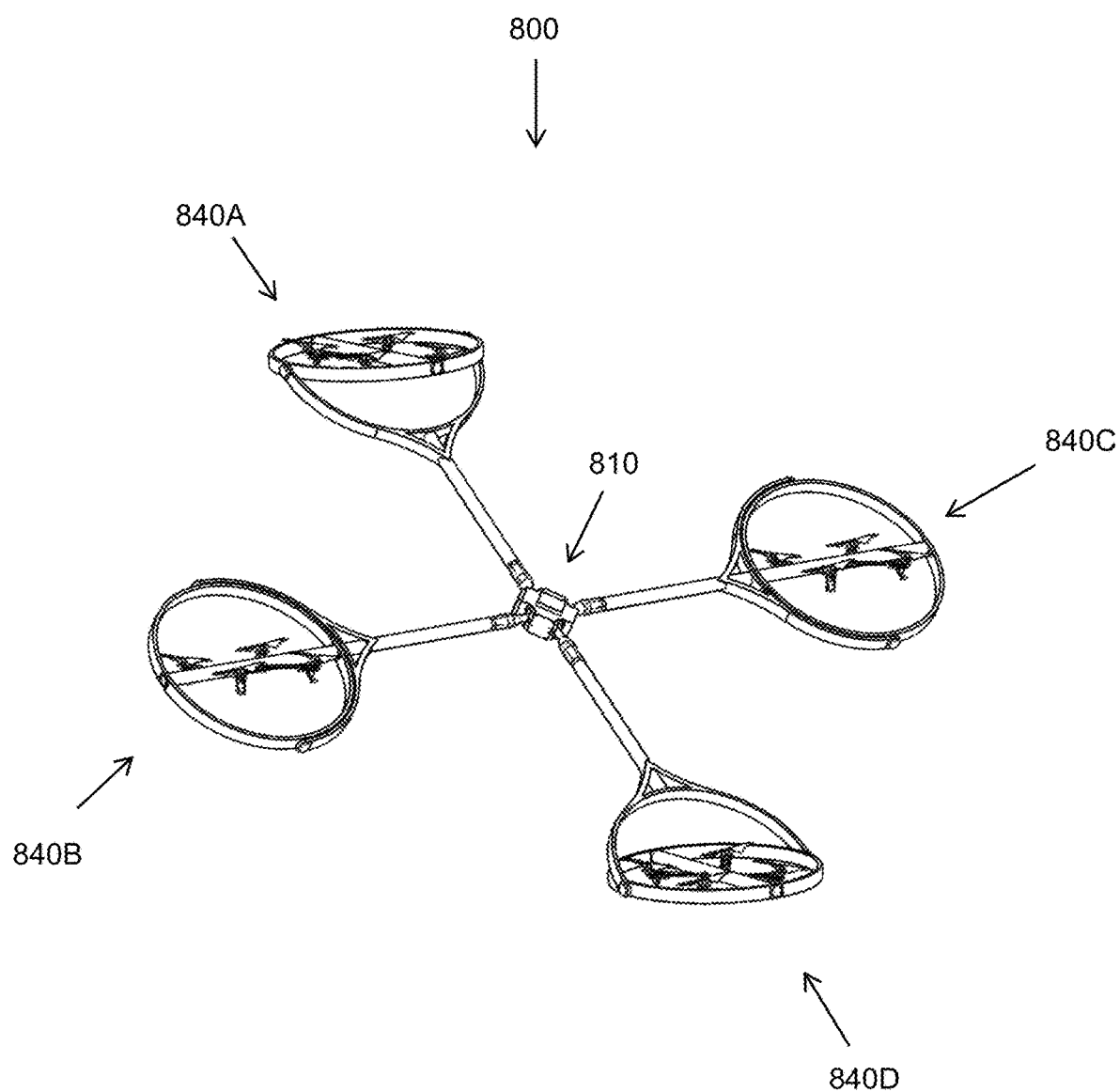
FIG. 8 illustrates an example of an unmanned aerial vehicle in an alternate stance.

FIG. 8 illustrates an example of an unmanned aerial vehicle in an alternate tilted stance. In this example, the central unit 810 is now pointed in an angled direction. The UAV 800 may be transformed into this angled stance from any stance, such as the level stance shown in FIG. 1. This stance may be formed by increasing the thrust of PU 840A, and decreasing the thrust of the opposite PU 840D, while maintaining the thrust of PUs 840B and 840C. By controlling the thrust of PUs 840, the UAV 800 will rotate about the central unit 810 until the desired angle of rotation is reached. Once the central unit 810 has the desired angle, each PU 840 may be returned to the same thrust magnitude to maintain a hover or continue flight. The increment or decrement of thrust and angle of each PU 840 may be configured based on a preset condition or by user request.

Figure 9:
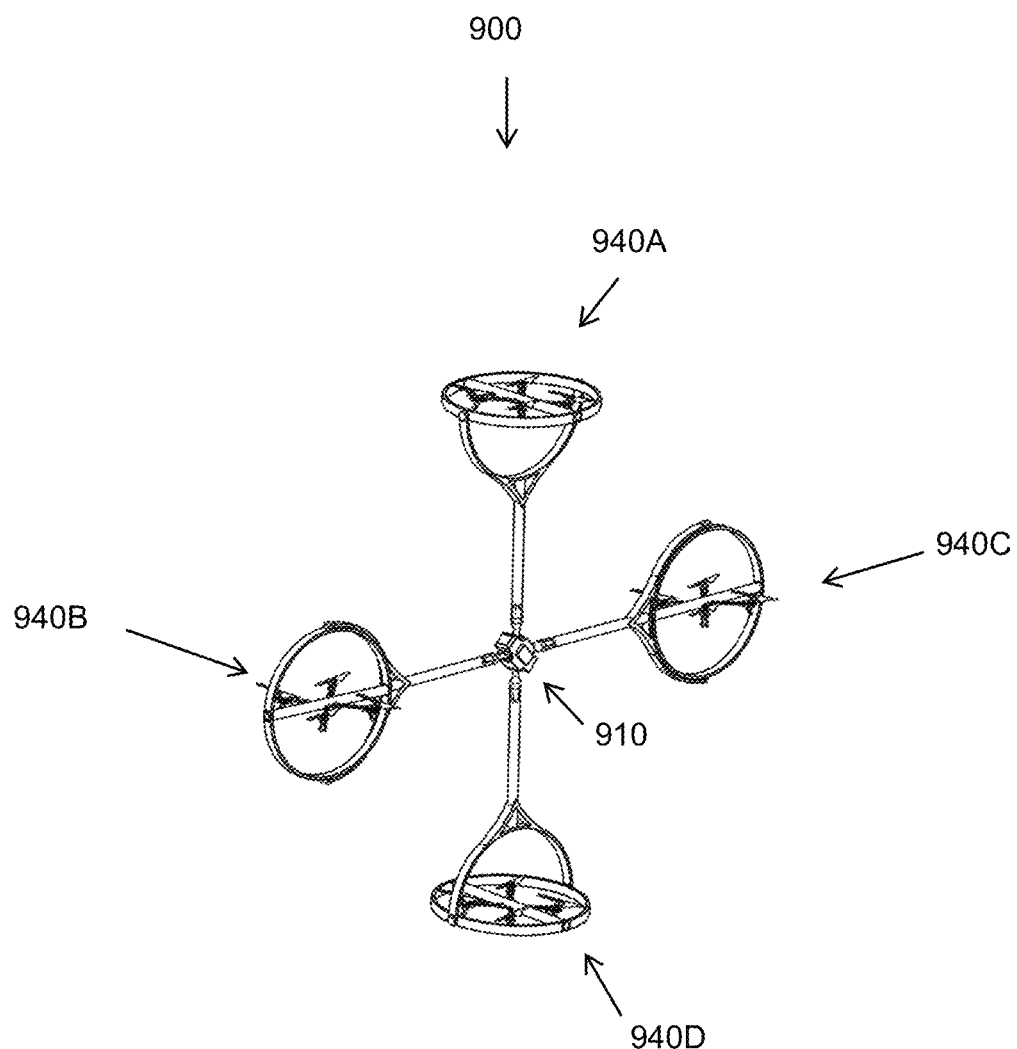
FIG. 9 illustrates an example of an unmanned aerial vehicle in an alternate stance.

FIG. 9 illustrates an example of an unmanned aerial vehicle in a vertical stance. In this example, the central unit is now pointed in sideways direction. The UAV 900 may be transformed into this vertical stance from any stance, such as the level stance shown in FIG. 1, or the angled stance of FIG. 8, by increasing the thrust of PU 940A (elevating the PU), and decreasing the thrust of the opposite PU 940D (descending the PU), while maintaining the thrust magnitude of PUs 940B and 940C. Once the central unit 910 has reached the desired sideways facing direction, each PU 940 may be returned to an equal thrust magnitude to maintain a hover.

The stance illustrated in FIG. 9 is one example of a formation which allows a UAV to continue hovering after the failure of a PU. For example, if a PU 940D failed, the remaining PUs 940A, B, C could be configured to assume the vertical stance of FIG. 9 in an emergency situation and maintain the same downward thrust with a balanced torque to achieve stable flight.

Although the subject matter has been described in a language specific to structural features, it is to be understood that the subject matter defined in the appended claims is not necessarily limited to the specific features described above. Rather, the specific features and acts described above are disclosed as example forms of implementing the claims.

What is claimed is:

1. An unmanned aerial vehicle with a omnidirectional thrust vectoring system, the unmanned aerial vehicle comprising:
   a central unit;
   a plurality of propulsion units, each propulsion units comprising:
      an omnidirectional frame comprising a rotational structure and a rotational joint mechanism enabling the rotational structure multiple degrees of freedom with respect to the central unit, and
      a plurality of independently controllable thrust sources, wherein the plurality of independently controllable thrust sources enable vectored thrust of an independently controllable and autonomous sub-vehicle operatively connected to the omnidirectional frame of the respective propulsion unit and to enable vectored thrust of the sub-vehicle within the omnidirectional frame,
   wherein the plurality of propulsion units enable the central unit orientation and translation with uncoupled six degrees of freedom; and
   a connective structure operatively connecting the plurality of propulsion units to the central unit.

2. The unmanned aerial vehicle of claim 1, wherein the rotational joint mechanism enables at least two rotational degrees of freedom of the rotational structure.

3. The unmanned aerial vehicle of claim 2, wherein the rotational joint mechanism further comprises a rotatable support rod.

4. The unmanned aerial vehicle of claim 1, wherein the plurality autonomous sub-vehicles are each configured for independent flight in all degrees of freedom.

5. The unmanned aerial vehicle of claim 1, wherein the central unit includes mounts for a plurality of payloads and electronics.

6. The unmanned aerial vehicle of claim 1, wherein the connective structure comprises a plurality of arms which connect the plurality of propulsion units to the central unit.

7. The unmanned aerial vehicle of claim 6, wherein the plurality of arms may be selectively translated with respect to the central body by rotatable linkages.

8. The unmanned aerial vehicle of claim 7, and further comprising rotatable joints enabling the plurality of arms translation through a plurality of degrees of freedom with respect to the central body.

* * * * *